United States Patent Office 2,965,632
Patented Dec. 20, 1960

2,965,632

PREPARATION OF STARCH ETHERS

Eugene F. Paschall, Orland Park, and William H. Minkema, La Grange, Ill., assignors to Corn Products Company, a corporation of Delaware No Drawing. Filed July 15, 1957, Ser. No. 671,724

6 Claims. (Cl. 260—233.3)

This invention relates to a process for preparing gelatinized cyanoethyl ethers of starch, particularly cyanoethyl ethers of starch which are potentially soluble or gelatinizable in water. More particularly this invention relates to the preparation of cyanoethyl ethers of starch in granule form and to a process of gelatinizing them without appreciably hydrolyzing their cyanoethyl groups to carboxyethyl groups.

Methods have been proposed in the past for cyanoethylating various carbohydrates. In U.S. Patent No. 2,316,129 a process is disclosed for preparing water-insoluble cyanoethyl ethers of starch by reacting starch in an aqueous alkaline solution with acrylonitrile. These products are described as rubber-like when partially dry, and brittle when dry. In U.S. Patent No. 2,461,502 galactomannan and glucomannan gums are cyanoethylated in alkaline water systems to produce cyanoethyl ether derivatives which are insoluble in water as well as in most common organic solvents. The insoluble nature of these derivatives in water and in common organic solvents greatly limits their usefulness.

It is also known to prepare water-soluble cyanoethyl ethers of starch which have been both degraded and gelatinized prior to or simultaneously with etherification. In order to purify these products, it is necessary to use costly washing procedures. Furthermore, due to their low order of reaction efficiency, high concentrations of unreacted acrylonitrile are undoubtedly present in the product making such processes both costly and hazardous.

We are also aware of U.S. Patent No. 2,520,161 and No. 2,316,128 wherein processes are described for hydrolyzing cyanoethyl ethers of starch or carbohydrate gums to carboxyethyl derivatives. In our process we seek to avoid this type of hydrolysis and still produce a product which can be made water soluble.

The main object of the present invention is to provide a process for gelatinizing cyanoethyl ethers of starch without appreciably hydrolyzing their cyanoethyl groups to carboxyethyl groups. Another object is to provide a process for making cyanoethyl ethers of starch which are potentially soluble or gelatinizable in water. A further object is to provide a process for making granular cyanoethyl ethers of starch which can be gelatinized without their cyanoethyl groups being appreciably hydrolyzed to carboxyethyl groups. Other groups will appear hereinafter.

For several reasons it is more desirable to prepare potentially water-soluble cyanoethyl ethers of starch in granule form rather than in pasted form. To begin with, starch solids in the reaction medium can be increased by about sixfold, and a more efficient utilization of acrylonitrile is achieved. Also, less alkaline catalyst need be employed per mole of glucose residue thus lessening the tendency toward nitrile hydrolysis. Furthermore, it is possible to purify these potentially water-soluble ethers by less expensive means due to their cold water-insolubility.

In attempting to prepare potentially water-soluble cyanoethyl ethers of starch in granule form, several difficulties were encountered. The introduction of as few as two cyanoethyl groups per 100 glucose units resulted in a product which could not be completely gelatinized by cooking in water at a neutral pH. Also, cyanoethyl ethers of starch having a degree of substitution (D.S.) above about 0.25 could not be prepared in an aqueous alkaline system without swelling the starch granules to the extent that filtration and subsequent washing with water were impossible. Strangely, although the 0.25 D.S. product swelled in water during the reaction, it could not be gelatinized by cooking in water at a substantially neutral pH.

We have now discovered ways of overcoming both of the above difficulties. First, by controlling the amount of alkaline material used in the reaction and, when necessary, incorporating a starch gelatinization inhibitor, such as sodium sulfate or sodium carbonate, in the reaction mixture, potentially water-soluble cyanoethyl ethers of starch ranging up to about 1.0 D.S. can be prepared in granule condition. Furthermore, the ethers can be easily purified by washing with water. The resulting air-dried products are friable and as such can be easily pulverized so that they form a granular dispersion in water. Cyanoethyl ethers of starch prepared by prior art processes, on the other hand, form brittle hard products which are difficult to disperse in water. Secondly, and perhaps of greater importance, we have now discovered that any of our granular cyanoethyl ethers of starch up to about 1.0 D.S. can be gelatinized without significant hydrolysis of their cyanoethyl groups to carboxyethyl groups. This was accomplished by cooking the granular ethers in water under very carefully controlled alkaline pH conditions not to exceed a value of about 11.0, preferably between about 9.5 and 11.0. Employing this process of gelatinization, we have been unable to detect the presence of any significant amount of carboxyethyl groups in our product. Also, based on nitrogen analysis of our gelatinized products, we obtain reaction efficiencies, based on acrylonitrile, in excess of 50 percent, generally in the order of 60 to 70 percent. On this basis alone, a substantial improvement over prior art processes is achieved.

In carrying out the invention, an aqueous slurry of ungelatinized starch is reacted with acrylonitrile in the presence of an alkaline catalyst and, when necessary, a starch gelatinization inhibitor. The reaction temperature should be sufficiently low to maintain the starch in the unswollen granule state. In general, temperatures between 30° and 50° C. are satisfactory, but higher or lower temperatures may be used depending on the alkalinity, amount of gelatinization inhibitor employed and the final D.S. of the product being made.

The reaction time and temperature are also interdependent; considerable variation in either or both of these is possible while still maintaining nongelatinizing conditions. For instance, the time required may be shortened by raising the temperature. As to the alkali concentration, it is not desirable to use more than about 0.15 mole nor less than about 0.02 mole of alkali per anhydro glucose unit of starch. Our preferred range is about 0.04 to 0.08 mole of alkali per anhydro glucose unit of starch. Any of the strongly alkaline materials may be used, e.g., alkali metal and alkaline earth metal hydroxides, such as sodium hydroxide, lithium hydroxide, potassium hydroxide and calcium hydroxide, or strong organic bases, such as tetraethanol ammonium hydroxide and tetraethyl ammonium hydroxide.

The amount of gelatinization inhibitor required to prevent starch gelatinization during the cyanoethylation reaction increases with product D.S., alkali concentration and reaction temperature. It may vary from 0 for a product below about 0.1 D.S. to about 0.6 mole for a product of 1.0 D.S. Such materials as sodium sulfate, potassium sulfate, sodium carbonate and the like may be used. However, we prefer sodium sulfate because it is not only inexpensive but also is more effective in inhibiting starch granule swelling.

After the reaction has proceeded to the desired degree, the resultant granular cyanoethyl starch, having a D.S. not exceeding about 1.0, is filtered and washed with water. If desired, it may also be dried, and the gelatinization effected any time thereafter, e.g., at time of use.

In order to gelatinize our potentially water-soluble, granular starch ether without hydrolyzing its cyanoethyl groups to carboxyethyl groups, the conditions during gelatinization must be very carefully controlled and consequently, are quite critical. First of all the granular cyanoethyl starch must not have a D.S. above about 1.0. Secondly, it must be dispersed in an alkaline aqueous slurry having a pH not exceeding about 11.0, preferably about 9.5 to 11.0. The exact pH value employed is dependent on the D.S. of the product and the cooking time. Any alkaline material or alkali liberating material capable of producing a pH in this range is suitable. Some which may be mentioned are sodium hydroxide, sodium phosphate, sodium carbonate, ammonia, triethylamine, or the like. From practical considerations, the temperature during gelatinization should be around 100° C. However, temperatures below or above 100° C. may be employed. At temperatures above 100° C. less alkaline material is required and below 100° C. more is required.

The invention is applicable to all varieties of raw starch, e.g., corn, tapioca, wheat, waxy sorghum, waxy maize, grain sorghum, rice and the like. Further, the invention is applicable to various modified starches and derivatives of starch, e.g., thin boiling starches, oxidized starches, starch ethers, starch esters and the like. The term "starch," as used in the claims, is intended to include all of the above listed substances.

The following examples which are typical will further illustrate the invention. However, they are intended as illustrative only and do not in any way limit the invention.

EXAMPLE I

*(A) Preparation of high D.S., thick-boiling, granular cyanoethyl starch*

One mole of raw corn starch at 12 percent moisture (180 g.) was slurried into a solution of 0.56 mole (80 g.) of $Na_2SO_4$ in 200 ml. of water. Then, 0.06 mole (4.0 g.) of NaOH in 50 ml. of water was slowly added to the slurry while agitating vigorously. The slurry was transferred to a reaction flask equipped for closure and agitation and the flask immersed in a constant temperature bath. One mole (66.3 ml.) of acrylonitrile was added to the system and the flask closed. After stirring for 6 hours at 40° C., the product was diluted with 250 ml. of water and then neutralized to pH 7 with HCl. The slurry was filtered and the filter cake washed with deionized water. Filter time was one minute and wash time 14 minutes indicating that detrimental gelatinization did not occur during reaction. The product contained 0.13 percent sulfated ash and 5.46 D.B. percent nitrogen. The low ash content indicates that salts were efficiently removed from the product.

*(B) Gelatinization of high D.S., thick-boiling, granular cyanoethyl starch*

This product was gelatinized in water using various alkaline substances as gelatinization catalysts. The slurry pH was adjusted initially to values ranging from 9.75 to 11.25. Experimental results are shown in Table I relating amount and type of catalyst to cooking time, viscosity and D.S. of the gelatinized paste. The paste from each of the products, after cooking until completely gelatinized, at a temperature of about 100° C. was purified by freeze drying followed by extensive washing with methanol to prepare for analysis. The D.S. was calculated from nitrogen content determined by the Kjeldahl method. The data in Table I show the practical pH and cooking time to effect complete gelatinization of each product. The result in Experiment No. 8 shows that at a pH 11.25 a detrimentally large number of cyanoethyl groups have been lost.

TABLE I

| Expt. No. | Gelatinization Catalyst | Catalyst, Mole/Mole Starch | Slurry, pH | Cooking Time, min. | Scott Visc., g./sec. | D.S. of Paste |
| --- | --- | --- | --- | --- | --- | --- |
| 1 | Sodium hydroxide | 0.0064 | 10.75 | 60 | 11/61 | 0.58 |
| 2 | Sodium hydroxide | 0.0048 | 10.60 | 145 | 11/62 | 0.58 |
| 3 | Sodium phosphate | 0.015 | 10.50 | 90 | 11/40 | 0.57 |
| 4 | Sodium phosphate | 0.0074 | 10.25 | 115 | 11/44 | 0.63 |
| 5 | Sodium carbonate | 0.0049 | 10.00 | 60 | 11/50 | 0.60 |
| 6 | Sodium carbonate | 0.0033 | 9.75 | 115 | 11/63 | 0.62 |
| 7 | Triethanol amine | 0.21 | 10.20 | 60 | 12/145 | |
| 8 | Sodium hydroxide | 0.0073 | 11.25 | 95 | 11/46 | 0.28 |

EXAMPLE II

*(A) Preparation of high D.S., 60-fluidity, granular cyanoethyl starch*

The same mole ratio of reagents as shown in Example I was used to prepare 100 pounds of high D.S. potentially water soluble cyanoethyl ether of starch from 60–F acid-modified starch. The reaction was carried out at 30° C. for 16 hours. The washed product contained 5.4 (dry basis) percent nitrogen.

*(B) Gelatinization of high D.S. 60-fluidity, granular cyanoethyl starch*

This product was gelatinized by cooking in water at various pH levels using a variety of alkaline substances as gelatinization catalysts. Results of Experiments 1, 3, 4, and 5, shown in Table II, illustrate that cooking at an initial slurry pH of 10–10.75 will gelatinize the products. Overall reaction efficiencies of the pasted products obtained, based on acrylonitrile, range from 59 to 64 percent thus showing a high retention of cyanoethyl groups on starch. Analysis for carboxyl groups indicates that less than 0.01 mole per mole of starch are present. Analyses for the presence of propionamide groups by measuring formaldehyde uptake on the pasted products at pH 10.5 were negative.

TABLE II

| Expt. No. | Gelatinization Catalyst | Catalyst, Mole/ Mole Starch | Slurry, pH | Cooking Time, min. | Scott Visc., g.-sec. | D.S. of Paste |
|---|---|---|---|---|---|---|
| 1 | Sodium hydroxide | 0.003 | 10.75 | 120 | 28.35/100 | 0.62 |
| 2 | Sodium hydroxide | 0.0061 | 11.00 | 60 | 28.35/31 | 0.52 |
| 3 | Sodium phosphate | 0.0063 | 10.50 | 45 | 28.35/110 | 0.64 |
| 4 | Sodium phosphate | 0.0063 | 10.50 | 70 | 28.35/52 | 0.59 |
| 5 | Sodium carbonate | 0.0032 | 10.00 | 120 | 28.35/100 | 0.64 |
| 6 | Sodium carbonate | 0.0025 | 9.5 | 130 | Not completely gelatinized. | 0.77 |

The approximate upper and lower initial slurry pH limits for gelatinization of high D.S., 60–F cyanoethyl starch are shown in Experiments 2 and 6 respectively of Table II. At an initial slurry pH of 11.0, appreciable degradation of cyanoethyl starch occurs judging from the low Scott viscosity. Also, at pH 11.0 a substantial portion of cyanoethyl groups are lost. Analysis for carboxyl on the purified paste showed that less than 0.01 mole per mole of starch was present. Thus, it appears that considerable scission of the ether linkage of the cyanoethyl starch ether groups occurs at pH levels of 11.0 or above. On the other hand, the high D.S., 60-F cyanoethyl starch would not gelatinize completely at pH 9.5.

EXAMPLE III

*Gelatinization of thick-boiling, cyanoethyl starch at various D.S. levels*

The initial slurry pH required to effect gelatinization without substantial degradation or hydrolysis of nitrile or cyanoethyl groups is to some extent a function of product D.S. In Table III, the results show the correlation conditions for gelatinization with pasted product D.S. and viscosity for cyanoethyl starches prepared using amounts of acrylonitrile ranging from 0.13 to 1.0 mole per mole of starch. Experimental conditions for cyanoethylation were the same as described in Example I. In general, the results show that somewhat higher pH values are required to gelatinize cyanoethyl starch at the higher D.S. levels.

TABLE III

| Expt. No. | Acrylonitrile, Mole/ Mole Starch | Slurry, pH | Cooking Time, min. | Scott Visc., g./sec. | D.S. of Paste | Reaction Efficiency |
|---|---|---|---|---|---|---|
| 1 | 0.13 | 10.0 | 110 | 11/100 | 0.09 | 69 |
| 2 | 0.25 | 10.25 | 70 | 11/95 | 0.15 | 60 |
| 3 | 0.37 | 10.3 | 90 | 11/80 | 0.22 | 59 |
| 4 | 0.50 | 10.5 | 60 | 11/82 | 0.27 | 54 |
| 5 | 0.75 | 10.75 | 50 | 11/78 | 0.37 | 49 |
| 6 | 1.0 | 10.75 | 60 | 11/61 | 0.58 | 58 |

We claim:

1. Process for gelatinizing a cyanoethyl ether of starch without appreciably hydrolyzing the cyanoethyl groups to carboxyethyl groups which comprises dispersing a granular cyanoethyl ether of starch having a degree of substitution not exceeding about 1.0 in an alkaline aqueous slurry at a pH not exceeding about 11.0, and then cooking said slurry to effect gelatinization.

2. Process according to claim 1, wherein said gelatinization takes place at a pH of 9.5 to 11.

3. Process for the preparation of a gelatinized cyanoethyl ether of starch which comprises reacting starch in the unswollen granule state in an alkaline aqueous slurry with acrylonitrile in the presence of a gelatinization inhibitor, at a temperature sufficiently low to maintain the starch in the unswollen granule state and for a time sufficient to produce a granular cyanoethyl ether of starch having a degree of substitution between about 0.1 and about 1.0, said slurry having an alkali concentration of about 0.02 to 0.15 mole of alkali per anhydro glucose unit of starch; removing said gelatinization inhibitor; and thereafter gelatinizing the thus formed ether in an alkaline aqueous slurry at a pH not exceeding about 11.0; the amount of acrylonitrile being about 0.12 to about 1.2 mole per anhydroglucose unit of starch.

4. Process according to claim 3, wherein said granular cyanoethyl ether of starch is washed with water, filtered, and reslurried before being gelatinized.

5. Process for the preparation of cyanoethyl ether of starch which is potentially water-soluble and gelatinizable in an aqueous slurry at a pH not exceeding about 11.0 and which can be purified by washing with water which comprises reacting starch in the unswollen granule state in an alkaline aqueous slurry with acrylonitrile in the presence of a gelatinization inhibitor, at a temperature sufficiently low to maintain the starch in the unswollen granule state and for a time sufficient to produce a granular cyanoethyl ether of starch having a degree of substitution between about 0.1 and about 1.0 and removing said gelatinization inhibitor; the amount of acrylonitrile being about 0.12 to about 1.2 mole per anhydro glucose unit of starch and the alkali concentration during the cyanoethylation reaction being between about 0.02 to 0.15 mole of alkali per anhydro glucose unit of starch.

6. Process according to claim 5, wherein said granular cyanoethyl ether of starch is washed with water, filtered and dried.

References Cited in the file of this patent

UNITED STATES PATENTS

| 2,316,129 | Bock et al. | Apr. 6, 1943 |
| 2,461,502 | Moe | Feb. 8, 1949 |
| 2,613,206 | Caldwell | Oct. 7, 1952 |
| 2,825,727 | Caldwell | Mar. 4, 1958 |

FOREIGN PATENTS

| 713,750 | Great Britain | Aug. 18, 1954 |